(12) United States Patent
Nguyen et al.

(10) Patent No.: US 10,527,799 B2
(45) Date of Patent: Jan. 7, 2020

(54) SPRING PUSH WITH INTEGRAL TRIGGER

(71) Applicant: US Conec, Ltd, Hickory, NC (US)

(72) Inventors: Hiep V. Nguyen, Fort Mill, SC (US); Joseph L. Graham, Hickory, NC (US)

(73) Assignee: US Conec, Ltd., Hickory, NC (US)

( * ) Notice: Subject to any disclaimer, the term of this patent is extended or adjusted under 35 U.S.C. 154(b) by 0 days.

(21) Appl. No.: 16/054,105

(22) Filed: Aug. 3, 2018

(65) Prior Publication Data

US 2018/0341067 A1 Nov. 29, 2018

Related U.S. Application Data

(62) Division of application No. 14/868,728, filed on Sep. 29, 2015, now Pat. No. 10,222,557.

(60) Provisional application No. 62/056,648, filed on Sep. 29, 2014.

(51) Int. Cl.
*G02B 6/38* (2006.01)

(52) U.S. Cl.
CPC ......... *G02B 6/3821* (2013.01); *G02B 6/3869* (2013.01); *G02B 6/3893* (2013.01)

(58) Field of Classification Search
CPC .................................................. G02B 6/3821
See application file for complete search history.

(56) References Cited

U.S. PATENT DOCUMENTS

| | | | |
|---|---|---|---|
| 5,481,634 A * | 1/1996 | Anderson | G02B 6/3893 385/55 |
| 5,579,425 A | 11/1996 | Lampert et al. | |
| 5,647,043 A | 7/1997 | Anderson et al. | |
| 6,017,154 A | 1/2000 | Carlisle et al. | |
| 6,019,521 A * | 2/2000 | Manning | G02B 6/3869 385/56 |
| 6,024,498 A | 2/2000 | Carlisle et al. | |
| 6,173,097 B1 | 1/2001 | Throckmorton et al. | |
| 6,361,218 B1 | 3/2002 | Matasek et al. | |
| 6,379,054 B2 | 4/2002 | Throckmorton et al. | |
| 6,409,393 B1 | 6/2002 | Grois et al. | |
| 6,456,768 B1 | 9/2002 | Boncek et al. | |
| 6,547,450 B2 | 4/2003 | Lampert | |
| 6,565,262 B2 | 5/2003 | Childers et al. | |
| 7,077,576 B2 | 7/2006 | Luther et al. | |
| 8,622,634 B2 | 1/2014 | Arnold et al. | |
| 8,684,611 B2 | 4/2014 | Childers et al. | |
| 8,876,405 B2 * | 11/2014 | Larson | G02B 6/3887 385/81 |
| 8,899,845 B2 | 12/2014 | Gallegos et al. | |
| 2001/0002220 A1 * | 5/2001 | Throckmorton | G02B 6/3806 385/66 |
| 2002/0076164 A1 | 6/2002 | Childers et al. | |
| 2003/0002812 A1 | 1/2003 | Lampert | |
| 2005/0069264 A1 | 3/2005 | Luther et al. | |
| 2006/0115219 A1 | 6/2006 | Mudd et al. | |
| 2006/0239619 A1 | 10/2006 | Luther et al. | |

(Continued)

*Primary Examiner* — Peter Radkowski

(74) *Attorney, Agent, or Firm* — Michael L. Leetzow, P.A.; Shubhrangshu Sengupta

(57) ABSTRACT

A spring push with a main body, a crimp portion and two extensions also provides a trigger extending from the main body. The extensions provide engagement with the connector housing and also surfaces to engage the spring. The spring push may be a single component or be comprised of two separate pieces. An adapter is also disclosed with a cut out portion on a bottom side.

19 Claims, 11 Drawing Sheets

(56) References Cited

U.S. PATENT DOCUMENTS

| | | |
|---|---|---|
| 2007/0098331 A1 | 5/2007 | Mudd et al. |
| 2012/0328248 A1* | 12/2012 | Larson ................ G02B 6/3887 385/81 |
| 2013/0028560 A1 | 1/2013 | Arnold et al. |
| 2014/0205245 A1 | 7/2014 | Gallegos et al. |

* cited by examiner

SPRING PUSH WITH INTEGRAL TRIGGER

REFERENCE TO RELATED CASE

This application is a divisional application of and claims priority to U.S. patent application Ser. No. 14/868,728, filed Sep. 29, 2015, and also claims priority under 35 U.S.C. § 119 (e) to provisional application No. 62/056,648 filed on Sep. 29, 2014, the contents of which are hereby incorporated by reference in their entirety.

BACKGROUND OF THE INVENTION

Field of the Invention

Fiber optic connectors may have a latch that assists in securing the fiber optic connector into an adapter or panel. However, the latches must have a portion that extends upward and/or outward from the adapter, allowing workers to disengage the fiber optic connectors from the adapter and/or panel. However, that latch then provides a snag point. Workers can catch clothing, tools, etc. on the latch and mistakenly disengage the fiber optic connector. Therefore, some fiber optic connectors have a trigger component that are added after the fiber optic connector has been terminated that protect the latches from the unintentional disengagement. The trigger component attaches to the fiber optic connector rearwardly of the connector housing (in an LC connector, for example) and covers the end of the latch. See, for example, FIG. 1. However, it would be more efficient if additional components were not need for the fiber optic connectors.

Thus, a component of the fiber optic connector, the spring push, has been designed to eliminate the additional component and provides the trigger.

SUMMARY OF THE INVENTION

The present invention is directed to a spring push having a trigger for use with a fiber optic connector that includes a main body having a forward facing surface, a rearward facing surface, and at least one side portion, two generally parallel extensions extending from the forward facing surface of the main body away from the rearward facing surface; the two generally parallel extensions configured to engage an elastic member therebetween and each of the parallel extensions having a projection to engage a connector housing of the fiber optic connector, a crimp portion extending from the rearward facing surface of the main body and away from the forward facing surface, the crimp portion having a central opening to allow optical fibers to pass therethrough and between the two generally parallel extensions; and a trigger extending from the at least one side portion to engage at least a portion of a latch on the connector housing of the fiber optic connector.

In some embodiments, the trigger extends away from the main body between the crimp portion and the two generally parallel extensions and then extends toward the two generally parallel extensions.

In some other embodiments, each of the two generally parallel extensions have a front end and a forward facing surface disposed between the front end and the main body to engage the elastic member.

According to another aspect of the present invention, a two-piece spring push for a fiber optic connector is disclosed that includes a first portion having two generally parallel extensions, a second portion, wherein the first portion and the second portion are mated to form a main body and a crimp portion, the main body having a forward facing surface, a rearward facing surface, and at least one side portion, the two generally parallel extensions extending from the forward facing surface of the main body away from the rearward facing surface, the crimp portion extending from the rearward facing surface of the main body and away from the forward facing surface and having a central opening to allow optical fibers to pass therethrough and between the two generally parallel extensions, and a trigger extending from the at least one side portion to engage at least a portion of a latch on the connector housing of the fiber optic connector.

In some embodiments, the trigger extends away from the main body between the crimp portion and the two generally parallel extensions and then extends toward the two generally parallel extensions.

In some embodiments, the trigger and the two generally parallel extensions lie in the same plane.

It is to be understood that both the foregoing general description and the following detailed description of the present embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
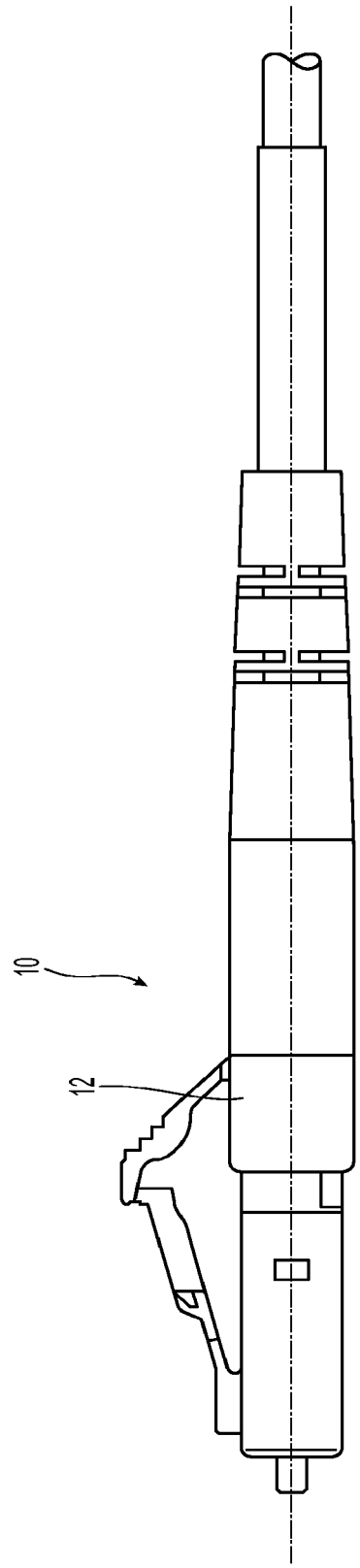
FIG. 1 is a side view of a prior art connector with a trigger adapter mounted thereto.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIG. 1, a prior art version of an LC connector 10 with a trigger adapter 12 is illustrated. The adapter 12 is added after the connector 10 is assembled. The adapter 12 requires extra steps in the assembly of the connector 10 and also provides more edges and surfaces to catch items on the connector. Thus, it would be beneficial to have a trigger that is integral with the fiber optic connector that eliminates these catch points.

Figure 2:
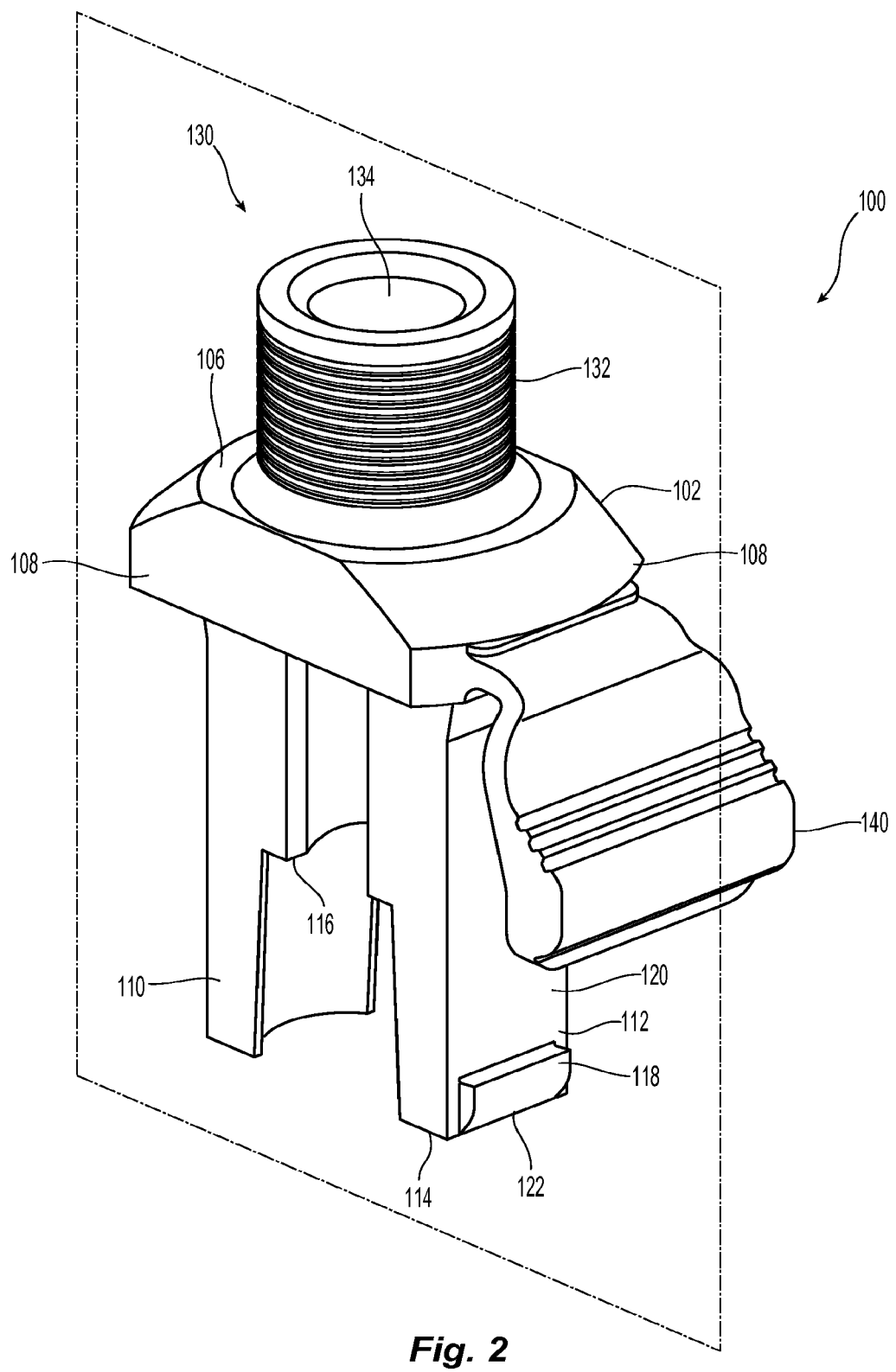
FIG. 2 is a perspective view of one embodiment of a spring push with a trigger according to the present invention.
Figure 3:
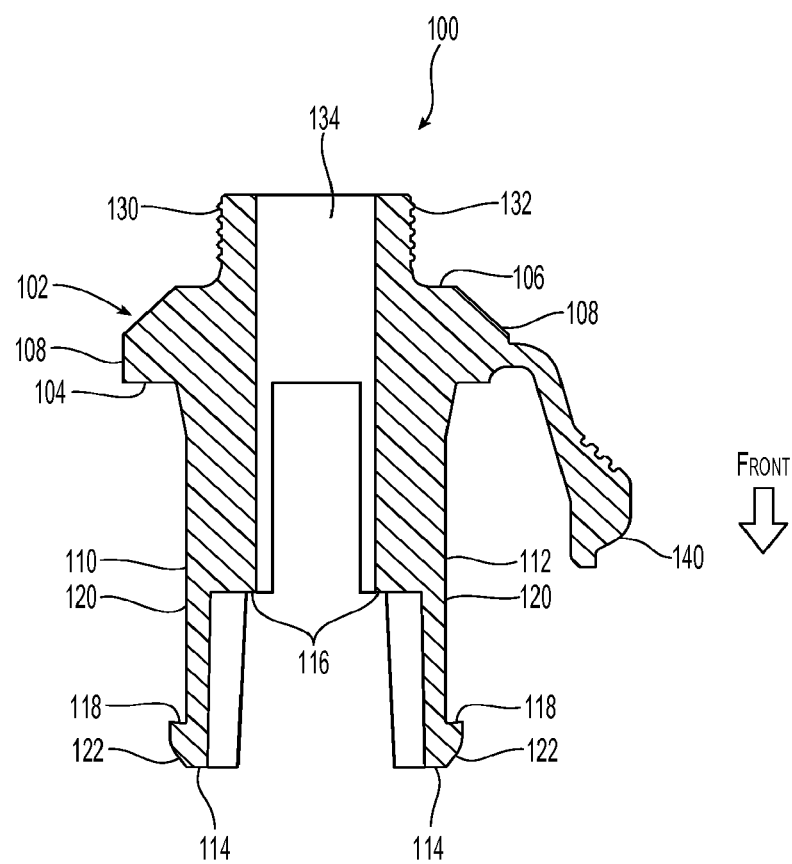
FIG. 3 is cross section of the spring push in FIG. 2.
Figure 4:
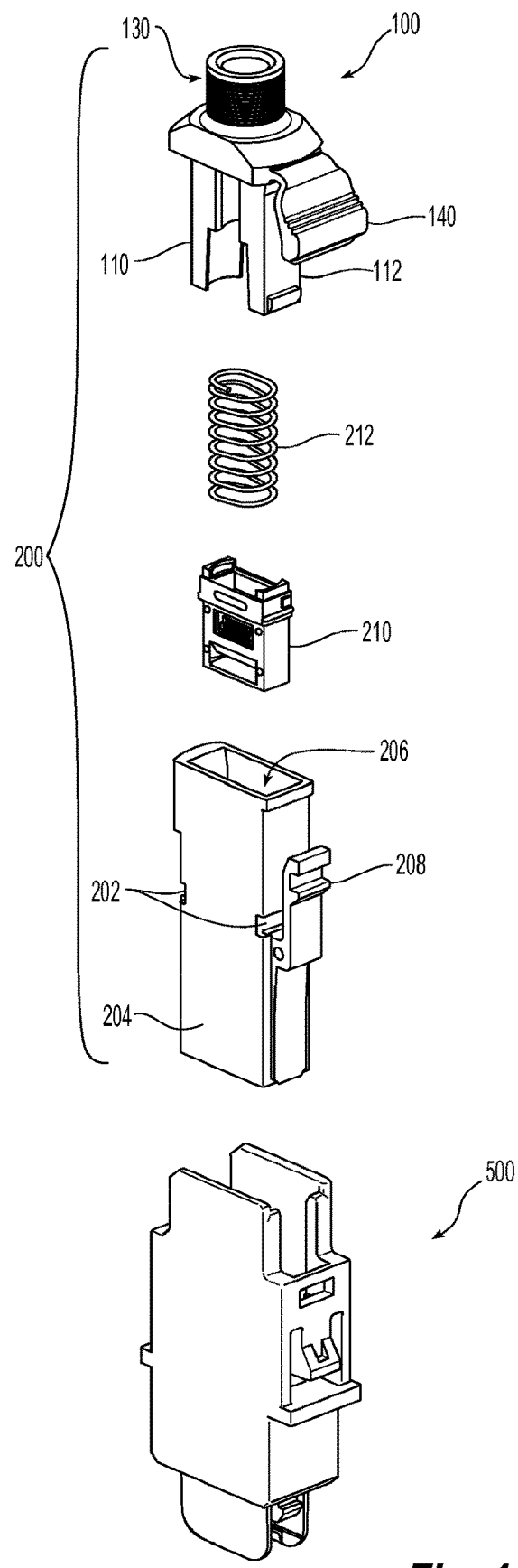
FIG. 4 is an exploded perspective view of the spring push of FIG. 1 along with the components of one embodiment of a fiber optic connector and an adapter.
Figure 5:
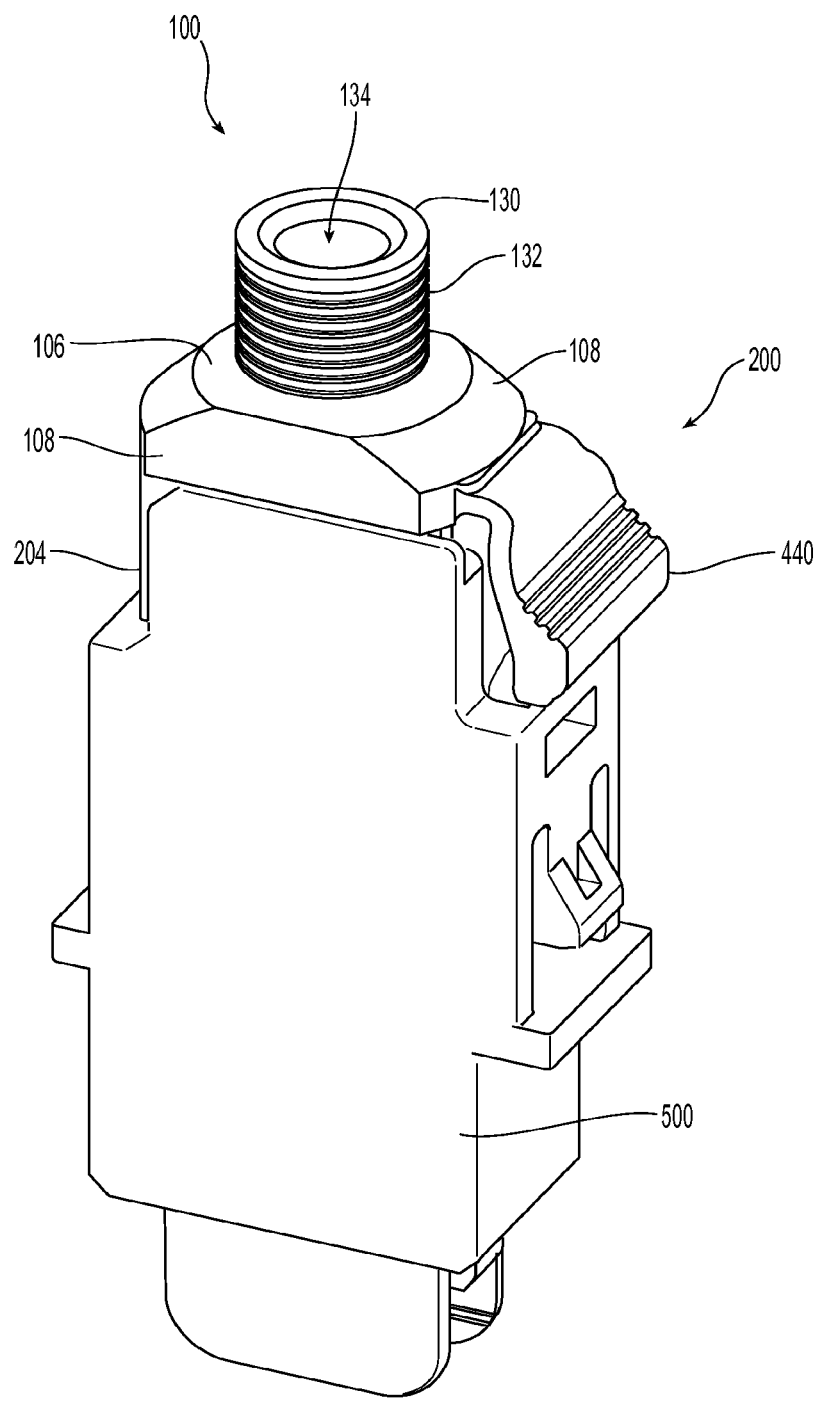
FIG. 5 is a perspective view of the spring push, fiber optic connector, and adapter of FIG. 4 in an assembled state.
Figure 6:
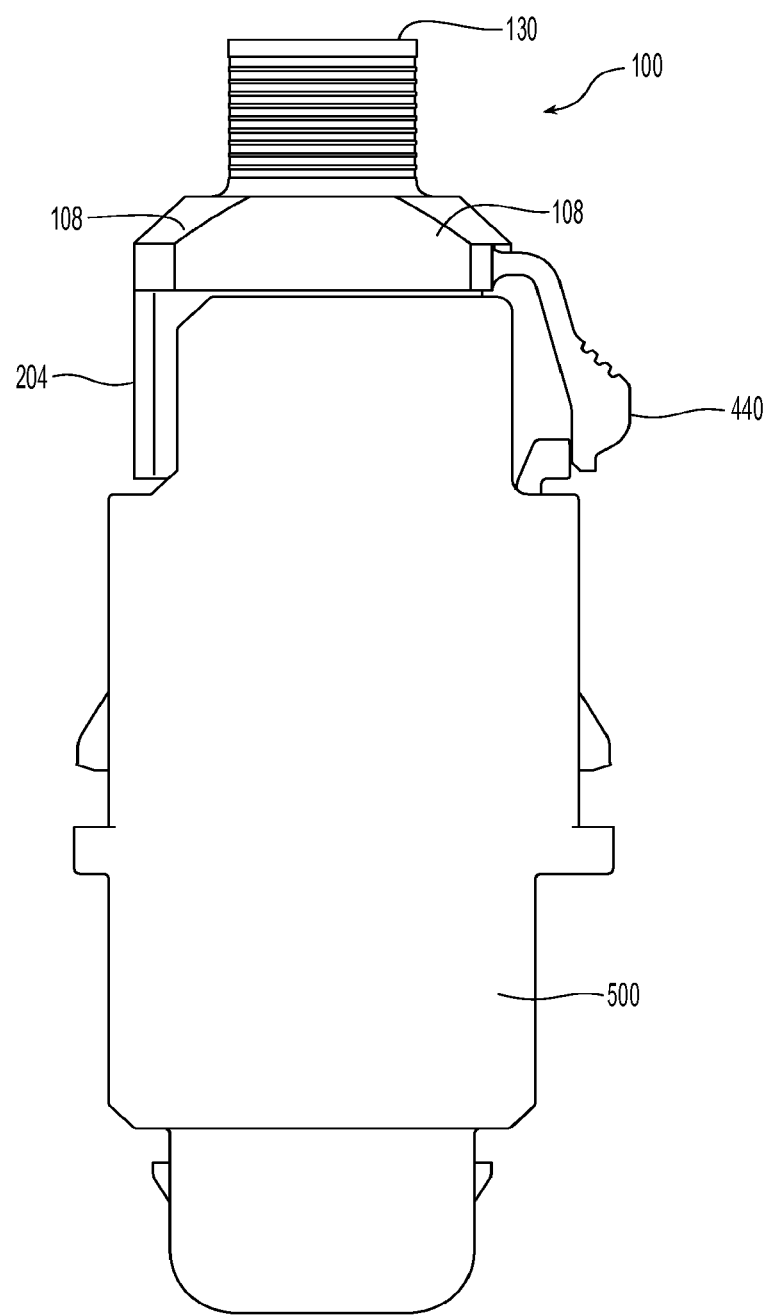
FIG. 6 is a side view of the spring push, fiber optic connector, and adapter of FIG. 5.
Figure 7:
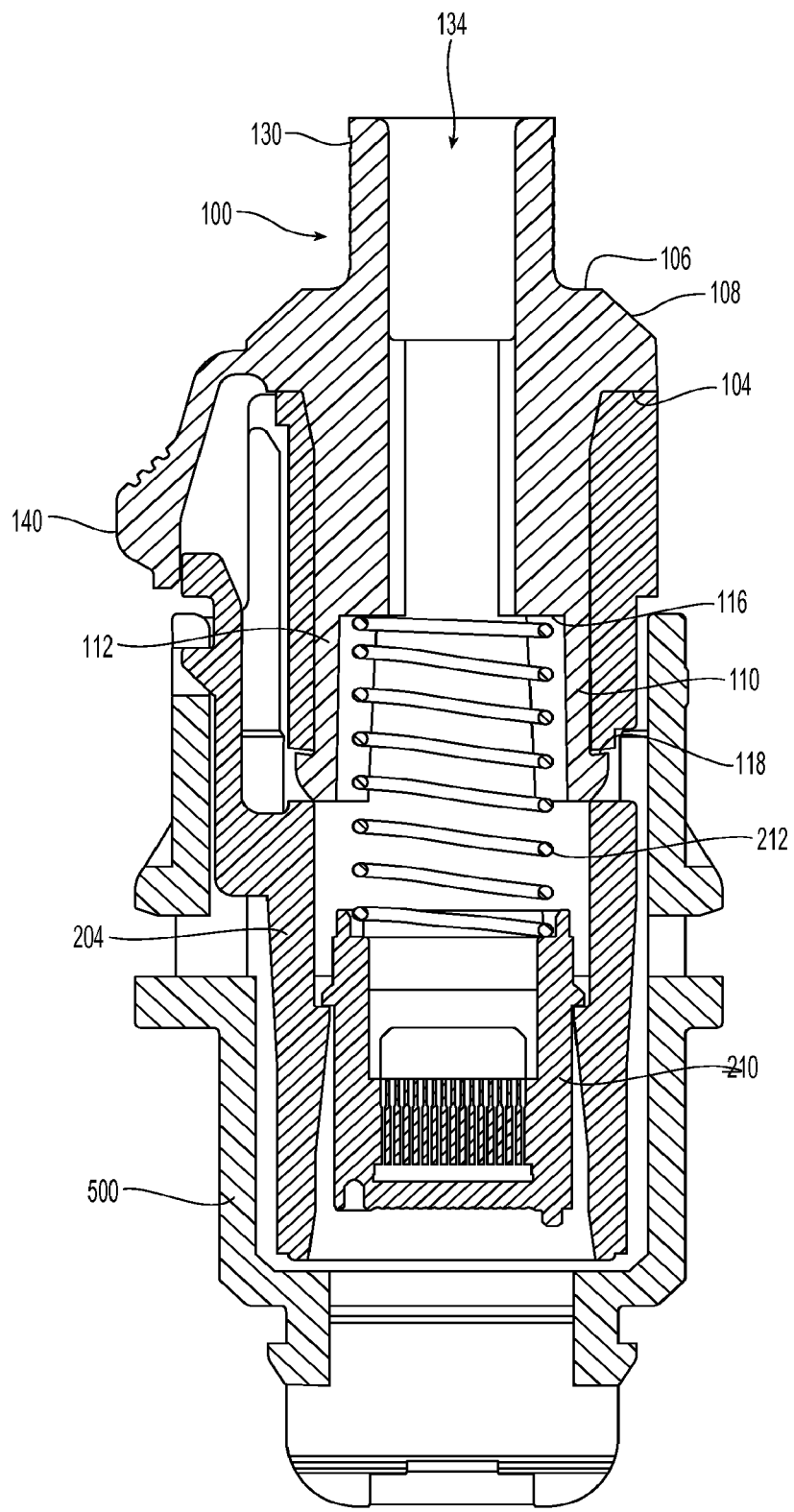
FIG. 7 is a cross section view of the spring push, fiber optic connector, and adapter of FIG. 5.

One embodiment of a spring push 100 according to the present invention is illustrated in FIGS. 2 & 3. The spring push 100 can be used as a part of a fiber optic connector 200 illustrated in FIGS. 4-7. The spring push 100 has a main body 102, the main body having a forward facing surface 104, a rearward facing surface 106, and side portions 108. Extending from the forward facing surface 104 of the main body 102 are two generally parallel extensions 110,112. The two generally parallel extensions 110,112 are spaced to allow for an elastic member, preferably a coil spring, to bias a fiber optic ferrule (see FIG. 4) toward the front of the fiber optic connector 200. Each of the two generally parallel extensions 110,112 have a front end 114. A forward facing surface 116 is disposed on each of the two generally parallel extensions 110,112 to engage the elastic member disposed therebetween. The term "front" and "forward" as used herein means that direction where the fiber optic connector would mate with another fiber optic connector or device, while the term rear is used to mean the direction from which the optical fibers come. So turning to FIG. 3, front is the direction shown by the arrow and "back" or "rearward" is the opposite direction.

Each of the two generally parallel extensions 110,112 also have a projection 118 on an outside surface 120 to engage a corresponding opening in the fiber optic connector 200 to engage recesses or openings 202 to retain the spring push 100 within the connector housing 204 of the fiber optic connector 200. The projections 118 may also have a chamfered leading edge 122 that allows for the front end 114 of the two generally parallel extensions 110,112 to more easily enter into the central opening 206 of the connector housing 204.

Extending from the rearward facing surface 106 is a crimp portion 130. The crimp portion 130 allows for the Kevlar cords and cable jacket (or other structural members) to be secured to the spring push 100 and the fiber optic connector 200 as is known in the art. As illustrated in the figures, the crimp portion 130 has an outer surface 132 that is preferably round and a round central opening 134. However, the shape of the outer surface 132 and the central opening 134 may take other shapes, including oval, hexagonal, etc. The shapes of the outer surface 132 and the central opening 134 may take any shape and still fall within the scope of the present invention.

A trigger 140 extends from one of the side portions 108 of the main body 102 of the spring push 100. The trigger 140 generally extends upward between the crimp portion 130 and the two generally parallel extensions 110,112 and then extends toward the front end 114 of the two generally parallel extensions 110,112. The trigger 140, when the spring push 100 is inserted into the connector housing 204, extends over the connector housing 204 and is disposed on top of the latch 208 on the connector housing 204. As is known in the art, the latch 208 secures the connector housing 204 into an adapter, such as the adapter 300 illustrated in FIG. 4, to keep the fiber optic connector 200 from being inadvertently removed from the adapter 300. With the trigger 140 disposed on top of the latch 208, it is more difficult to inadvertently remove the fiber optic connector 200 from the adapter 500. See FIGS. 10 and 11. The trigger 140 also extends from the side portion between the crimp portion 130 and the two generally parallel extensions 110,112, but could also extend from the side portion between the two generally parallel extensions 110,112 (i.e., 90 degrees around the main body 102 from where it is illustrated) and still fall within the scope of the present invention. The location of the trigger 140 depends on where the latch 208 on the connector housing 204 is disposed. In the present embodiment illustrated in FIGS. 2-7, the trigger 140 is in a plane that also passes through the center of the two generally parallel extensions 110,112. See FIG. 2.

As referenced to above and illustrated in FIGS. 4-7, one embodiment of a fiber optic connector 200 that can be used with the inventive spring push 100 includes the connector housing 204, a ferrule 210, a spring 212, and the spring push 100. Additional fiber optic connector elements may also be included but are not illustrated herein, such as guide pins, a pin keeper, etc. These fiber optic connector elements may also have other configuration and still come within the scope of the present invention and the appended claims. For example, the spring could have a configuration other than the rectangular shape illustrated herein.

Figure 8:
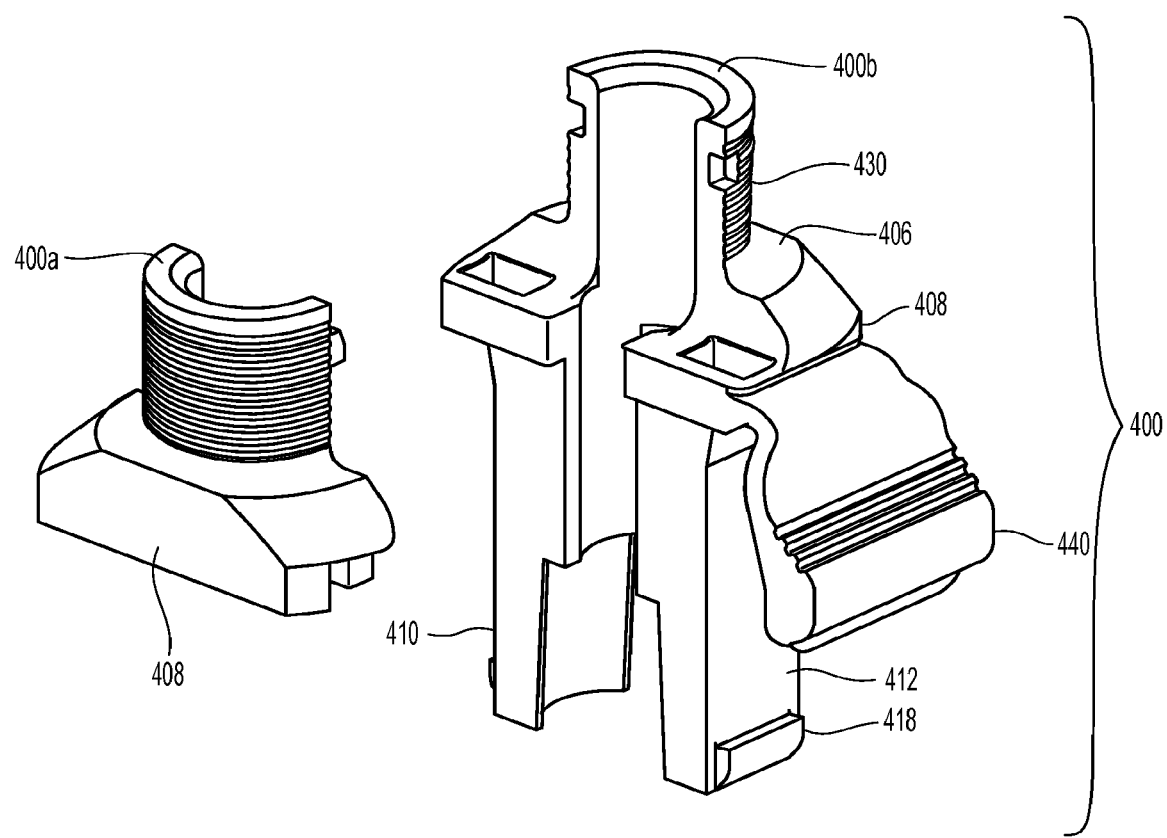
FIG. 8 is an exploded perspective view of a second embodiment of a spring push with a trigger according to the present invention.
Figure 9:
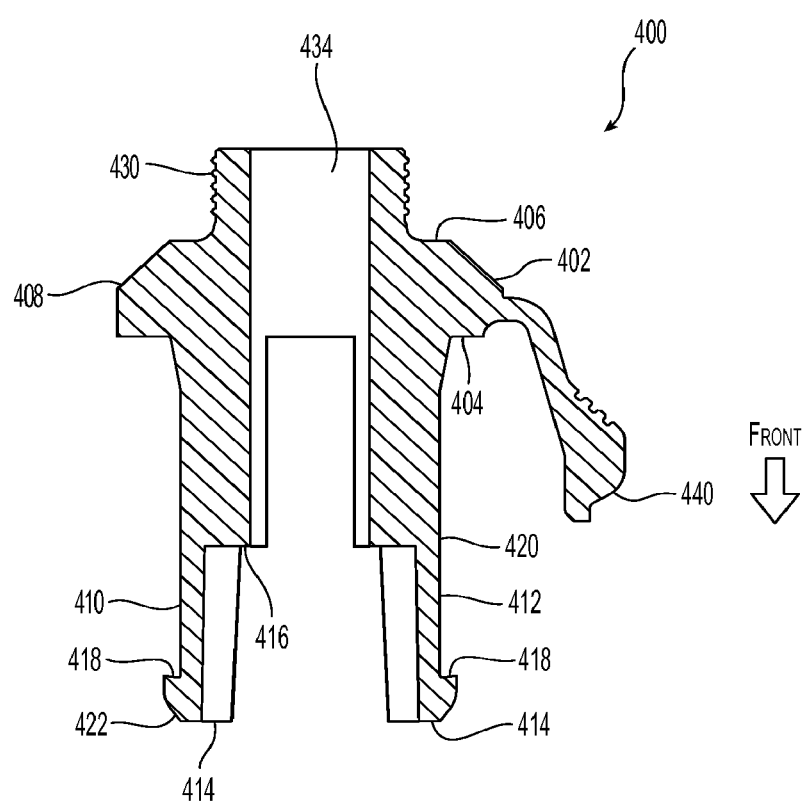
FIG. 9 is a cross section of the spring push in FIG. 8.

Another embodiment of a two-piece spring push 400 is illustrated in FIG. 8. Spring push 400 functions similarly to spring push 100, but is formed to two portions 400a and 400b that make up the main body 402 and the crimp portion 430. The main body 402 has a forward facing surface 404, a rearward facing surface 406, and side portions 408. Extending from the forward facing surface 404 of the main body 402 are two generally parallel extensions 410,412 and extending from the rearward facing surface 406 is the crimp portion 430.

The two generally parallel extensions 410,412 are spaced to allow for an elastic member to bias a fiber optic ferrule, such as fiber optic ferrule 210, toward the front of the fiber optic connector 200. Each of the two generally parallel extensions 410,412 have a front end 414. A forward facing surface 416 is disposed on each of the two generally parallel extensions 410,412 to engage the elastic member disposed therebetween. The term "front" and "forward" as used with this embodiment has the same meaning as that indicated above.

Each of the two generally parallel extensions 410,412 also have a projection 418 on an outside surface 420 to engage a corresponding opening in the fiber optic connector 200 to engage recesses or openings 202 to retain the spring push 400 within the connector housing 204 of the fiber optic connector 200. The projections 418 also have a chamfered leading edge 422 that allows for the front end 414 of the two generally parallel extensions 410,412 to more easily enter into the central opening 206 of the connector housing 204.

A trigger 440 extends from one of the side portions 408 of the main body 402 of the spring push 400. The trigger 440 generally extends upward between the crimp portion 430 and the two generally parallel extensions 410,412 and then extends toward the front end 414 of the two generally parallel extensions 410,412. The trigger 440, when the spring push 400 is inserted into the connector housing 204, extends over the connector housing 204 and is disposed on top of the latch 208 on the connector housing 204.

The trigger 440 also extends from the side portion 408 between the crimp portion 430 and the two generally parallel extensions 410,412, but could also extend from the side portion 408 between the two generally parallel extensions 410,412 (i.e., 90 degrees around the main body 402 from where it is illustrated) and still fall within the scope of the present invention. The location of the trigger 440 depends on where the latch 208 on the connector housing 204 is disposed.

The details of the two-piece spring push 400 are detailed in U.S. Pat. No. 8,684,611 to Childers et al., the contents of which are incorporated herein by reference. However, there could be other configurations of a two-piece spring push that would still fall within the scope of the present invention and the appended claims.

Figure 10:
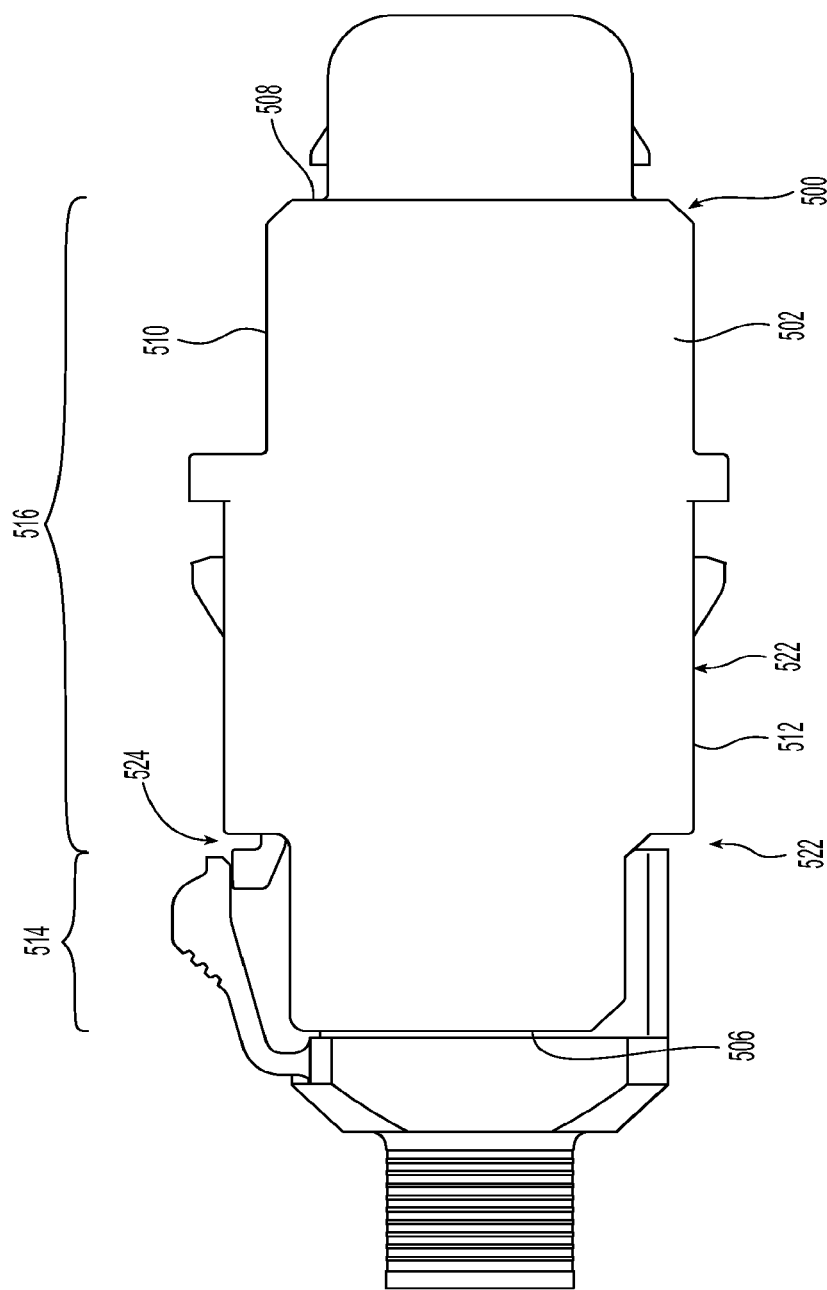
FIG. 10 is a side view of one embodiment of an adapter according to the present invention.
Figure 11:
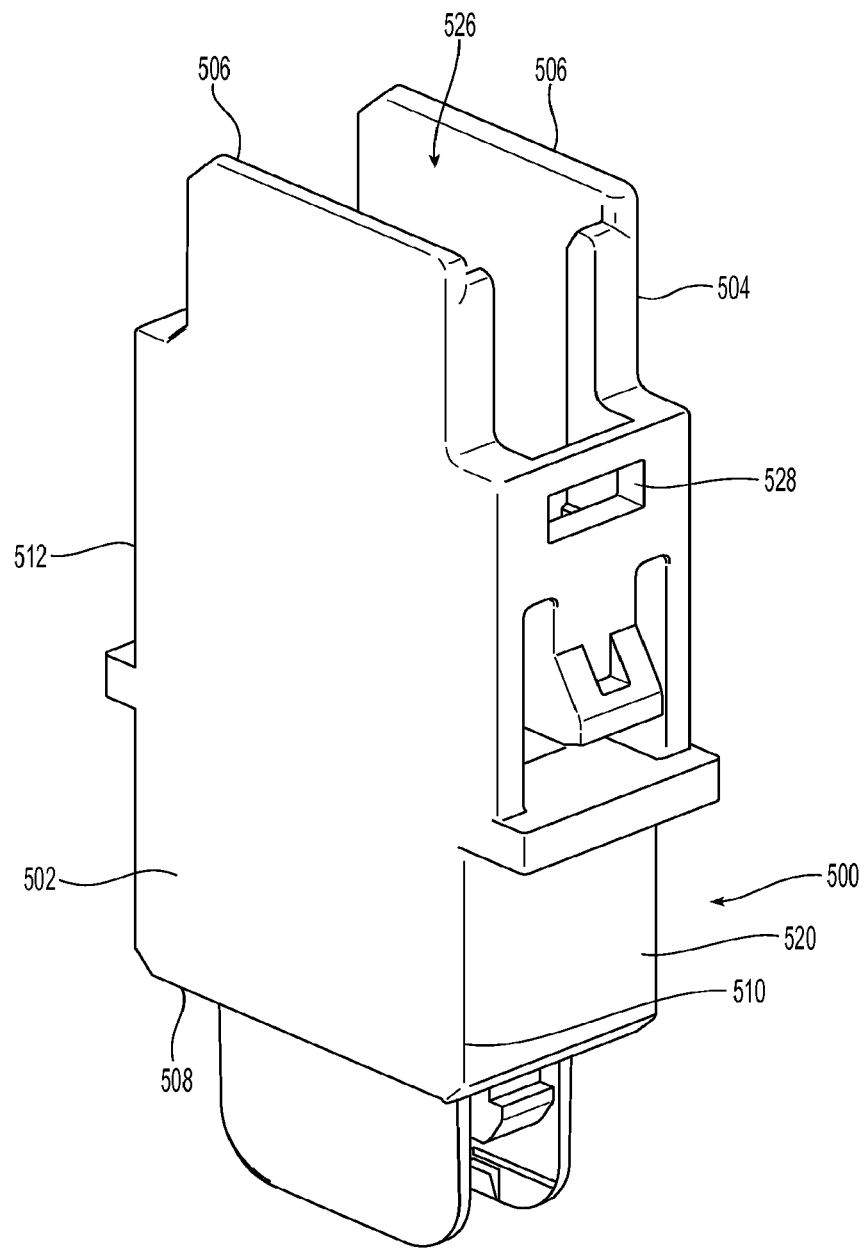
FIG. 11 is a perspective view of the adapter of FIG. 10.

FIGS. 10 and 11 illustrate an adapter 500 that can be used with a fiber optic connector that uses the spring pushes described above. The adapter has two side panels 502, 504 having a first end 506 and a second end 508. Each of the side panels 502,504 has an upper edge 510 and a lower edge 512 as well as a first portion 514 and a second portion 516. The first portion 514 has smaller width, that is the distance between the upper and lower edges 510,512, than the width of the second portion 516.

The adapter 500 also has an top panel 520 and a lower panel 522, which together with the side panels 502,504 create a passageway 526 in the adapter 500. The top panel 520 also has an opening 528 in communication with the passageway 526 to receive a portion of a latch from the fiber optic connector, the latch retaining the fiber optic connector in the adapter 500. The top panel 520 and the lower panel 522 extend only along the length of the second portions 516 of the side panels 502, 504. They do not extend all the way to the first end of the side panels 502, 504. With the top panel 520 and the lower panel 522 stopping at the first portion 514 and the reduced width of the side panels 502, 504, there are essentially cut-out portions 522,524 at the first end 506 to allow access to the bottom and top of the fiber optic connector while maintaining the alignment and protection afforded by the side panels 502, 504. The cut-out portion 524 at the top of the adapter 500 allows for the latch to be depressed and the fiber optic connector removed from the adapter 500. The lower cut-out portion 522 allows access to the bottom surface of the fiber optic connector so that the latch can be depressed and the fiber optic connector removed therefrom.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A two-piece spring push for a fiber optic connector comprising:
   a first portion having two generally parallel extensions;
   a second portion, wherein the first portion and the second portion are mated to form a main body and a crimp portion, the main body having a forward facing surface, a rearward facing surface, and at least one side portion, the two generally parallel extensions extending from the forward facing surface of the main body away from the rearward facing surface, the crimp portion extending from the rearward facing surface of the main body and away from the forward facing surface and having a central opening to allow optical fibers to pass therethrough and between the two generally parallel extensions; and
   a trigger extending from the at least one side portion to engage at least a portion of a latch on the connector housing of the fiber optic connector.

2. The two-piece spring push according to claim 1, wherein the crimp body has a generally cylindrical outer surface.

3. The two-piece spring push according to claim 1, wherein the trigger extends away from the main body between the crimp portion and the two generally parallel extensions and then extends toward the two generally parallel extensions.

4. The two-piece spring push according to claim 1, wherein the central opening extends from the back end and through the main body towards the front end.

5. The two-piece spring push according to claim 1, where the trigger and the two generally parallel extensions lie in the same plane.

6. The two-piece spring push according to claim 1, wherein the central opening in the crimp portion is round.

7. The two-piece spring push according to claim 1, wherein the central opening in the crimp portion is oval.

8. The two-piece spring push according to claim 1, wherein the trigger is configured to engage a top portion of the latch.

9. A two-piece spring push for use with a fiber optic connector comprising:
   a first portion forming a main body, the main body having a front end, a back end, a middle portion disposed between, and at least one side portion, the front end comprising two generally parallel extensions extending from the middle portion and having an opening therebetween, the back end forming at least a first portion of a cylinder;
   a second portion forming a cap configured to mate with the main body, the cap engaging at least a portion of the middle portion of the main body and at least a portion of the back end, the cap and the main body forming an opening through at least a portion of the spring push; and
   a trigger extending from the at least one side portion to engage at least a portion of a latch on a connector housing of the fiber optic connector.

10. The two-piece spring push according to claim 9, wherein the first portion and the second portion include openings and projections for mating.

11. The two-piece spring push according to claim 9, wherein the second portion includes a second portion of a cylinder such that when the first and the second portion are mated, the first and second portions of a cylinder form a crimp portion forming at least a portion of the opening to allow optical fibers to pass therethrough and between the two generally parallel extensions.

12. The two-piece spring push according to claim 11, wherein the portion of the opening formed by the crimp portion is in communication with the opening between the two generally parallel extensions.

13. The two-piece spring push according to claim 11, wherein the portion of the opening formed by the crimp portion is of a non-circular cross-section.

14. The two-piece spring push according to claim 9, wherein each of the generally parallel extensions has a projection to engage the connector housing of the fiber optic connector.

15. The two-piece spring push according to claim 14, wherein the projection has a chamfered edge.

16. The two-piece spring push according to claim 14, wherein the projection has a rounded surface.

17. The two piece spring push according to claim 9, wherein the portion of the latch is under the trigger when the two-piece spring push is engaged with the connector housing.

18. The two piece spring push according to claim 9, wherein the two-piece spring push includes a projection to engage a connector housing of the fiber optic connector, and upon engagement the connector housing and the spring push are mateable with an adapter such that the trigger and at least a portion of the connector housing lie outside the adapter.

19. A spring push for a fiber optic connector comprising:
- a main body and a cap, the main body and cap secured to one another only by friction caused by mating the main body and cap, the main body having a front end, a back end, a middle portion disposed therebetween and at least one side portion, and the cap having a front end terminating at the middle portion;
- an opening formed by the mated main body and cap extending through at least a portion of the spring push;
- a crimp body formed by the mating of the main body and cap at a back end thereof; and
- a trigger extending from the at least one side portion to engage at least a portion of a latch on a connector housing of the fiber optic connector.

* * * * *